United States Patent
Miyoshi

(10) Patent No.: US 9,051,995 B2
(45) Date of Patent: Jun. 9, 2015

(54) GEAR UNIT

(75) Inventor: Hiroyuki Miyoshi, Tsu (JP)

(73) Assignee: Nabtesco Corporation (JP)

( * ) Notice: Subject to any disclaimer, the term of this patent is extended or adjusted under 35 U.S.C. 154(b) by 0 days.

(21) Appl. No.: 14/345,120

(22) PCT Filed: Aug. 23, 2012

(86) PCT No.: PCT/JP2012/005285
§ 371 (c)(1),
(2), (4) Date: Mar. 14, 2014

(87) PCT Pub. No.: WO2013/038600
PCT Pub. Date: Mar. 21, 2013

(65) Prior Publication Data
US 2014/0371019 A1    Dec. 18, 2014

(30) Foreign Application Priority Data

Sep. 14, 2011 (JP) ................................. 2011-200931

(51) Int. Cl.
    *F16H 1/32*      (2006.01)
    *F16H 57/08*      (2006.01)

(52) U.S. Cl.
    CPC ............. *F16H 1/32* (2013.01); *F16H 2001/323* (2013.01)

(58) Field of Classification Search
    USPC .......................................... 475/168, 178, 179
    See application file for complete search history.

(56) References Cited

U.S. PATENT DOCUMENTS

| 5,472,384 | A | | 12/1995 | Haga | |
| 5,655,985 | A | * | 8/1997 | Herstek | 475/179 |
| 5,701,671 | A | | 12/1997 | Haga | |
| 7,534,184 | B2 | * | 5/2009 | Tsurumi | 475/162 |
| 2008/0207377 | A1 | * | 8/2008 | Tsurumi et al. | 475/168 |

FOREIGN PATENT DOCUMENTS

| JP | 5-180277 | 7/1993 |
| JP | 5-196098 | 8/1993 |
| JP | 5-196099 | 8/1993 |
| JP | 8-226498 | 9/1996 |
| JP | 2009-287725 | 12/2009 |
| JP | 2009-299766 | 12/2009 |

OTHER PUBLICATIONS

International Search Report of Sep. 19, 2012.

* cited by examiner

*Primary Examiner* — Ramya Burgess
*Assistant Examiner* — Timothy Hannon
(74) *Attorney, Agent, or Firm* — Gerald E. Hespos; Michael J. Porco; Matthew T. Hespos

(57) ABSTRACT

A gear unit has a washer which is provided at a position where the washer is able to come into contact with a retainer of roller bearings provided to each of adjacent eccentric parts in a crank shaft, and which regulates a movement of the roller bearing in an axial direction. A housing recess which houses the washer is formed on at least one face of the faces of adjacent oscillating gears facing each other. The housing recess includes an axial direction regulating surface which regulates movement of the washer in the axial direction, and a radial direction regulating surface which regulates movement of the washer in the radial direction.

5 Claims, 9 Drawing Sheets

GEAR UNIT

TECHNICAL FIELD

The present invention relates to a gear unit including a plurality of oscillating gears.

BACKGROUND ART

Conventionally, as an eccentrically oscillating gear unit for driving robot members and the like, known is an eccentrically oscillating gear unit like the type described in Japanese Patent Application Publication No. H8-226498. This kind of gear unit comprises an outer cylinder, a plurality of internal gear pins, a carrier, a crank shaft, and a plurality of oscillating gears. The plurality of internal gear pins are mounted along the axial direction of the outer cylinder on the inner peripheral face of the outer cylinder. The carrier is housed inside the outer cylinder. The crank shaft is rotatably supported by the carrier. The plurality of oscillating gears are supported by the carrier so as to oscillate in conjunction with the rotation of the crank shaft, and engage with the internal gear pin.

With this kind of gear unit, the respective eccentric parts of the crank shaft that eccentrically oscillates the oscillating gear are engaged with through-holes formed on the oscillating gear via a roller bearing such as a needle bearing.

The needle bearing is provided to the respective eccentric parts of the crank shaft. The needle bearing is supported so that the oscillating gear becomes relatively rotatable in relation to the eccentric parts of the crank shaft. The needle bearing comprises a plurality of needle rollers, and a retainer which rollably supports the needle roller. The needle roller comprises a narrow cylindrical roller.

The end faces of the retainer of the adjacent needle bearings are in direct contact with each other. Consequently, movement of the crank shaft in the axial direction in the needle bearing is regulated.

Nevertheless, with this kind of structure in which the end faces of the retainers are in direct contact, when the eccentricity in which the eccentric parts in the crank shaft become decentered from the shaft part increases, the contact area of the retainers decreases and, consequently, the contact portion across the circumferential direction of the retainers becomes small. As a result, there is a possibility that this may cause the early breakage of the retainer and the needle bearing containing the retainer.

Meanwhile, with the gear unit described in Japanese Patent Application Publication No. H5-180277, the retainers are not in direct contact, a disk-shaped flange is provided between the retainers, and movement of the needle bearing in the axial direction is regulated by the flange. The flange is provided integrally with the crank shaft between the eccentric parts in the crank shaft.

With the gear unit described in Japanese Patent Application Publication No. H5-180277, the flange is provided at a position outside the axial direction relative to the oscillating gear between the eccentric parts of the crank shaft. Thus, with this crank shaft, the gap between the eccentric parts needs to be broadened in the amount of the thickness of the flange and, consequently, the crank shaft needs to be extended in the axial direction. Thus, it may become difficult to downsize the gear unit.

SUMMARY OF THE INVENTION

An object of the present invention is to provide a gear unit capable of regulating the movement of the roller bearing in the axial direction without affecting the length of the crank shaft.

In order to achieve the foregoing object, the gear unit of the present invention is a gear unit for transmitting torque, at a predetermined reduction gear ratio, between a pair of partner members which are relatively and rotatably coupled to each other, this gear unit including: an outer cylinder which can be fixed to one of the partner members; a plurality of internal gear pins which are mounted on an inner peripheral face of the outer cylinder; a carrier which is housed inside the outer cylinder and can be fixed to the other one of the partner members; a crank shaft which includes a shaft part rotatably supported by the carrier and a plurality of eccentric parts which are decentered relative to the shaft part; a plurality of oscillating gears which include through-holes of a size, in which the eccentric parts of the crank shaft can be inserted therethrough, and external teeth capable of engaging with the internal gear pin, and which are supported by the carrier so as to oscillate in conjunction with a rotation of the crank shaft; a plurality of roller bearings which are respectively provided to the plurality of eccentric parts of the crank shaft, and support the oscillating gear so that it is relatively rotatable in relation to the eccentric parts of the crank shaft on an inner peripheral face of the through-holes of the oscillating gear, and has rolling elements and a retainer which rollably retains the rolling element between the oscillating gear and the eccentric parts; and a washer which is provided at a position where the washer is able to come into contact with the retainer of the roller bearing provided to each of the adjacent eccentric parts, and which regulates a movement of the roller bearing in an axial direction, wherein a housing recess which houses the washer is formed on at least one face among faces of the adjacent oscillating gears that face each other, the washer is housed in the housing recess, and the housing recess includes an axial direction regulating surface which comes into contact with the washer from the axial direction of the crank shaft and regulates movement of the washer in the axial direction, and a radial direction regulating surface which comes into contact with an outer peripheral surface of the washer and regulates movement of the washer in a radial direction.

EMBODIMENTS OF THE INVENTION

The coupled structure of the gear unit according to an embodiment of the present invention is now explained in detail with reference to the drawings.

First Embodiment

The gear according to the first embodiment is a gear unit that is applied as a reduction gear to a revolving superstructure such as a revolving body or a wrist joint of a robot or a revolving superstructure of various machine tools. In the ensuing explanation of this embodiment, described is an example of applying the gear unit to a revolving superstructure such as an arm of a robot.

Figure 1:
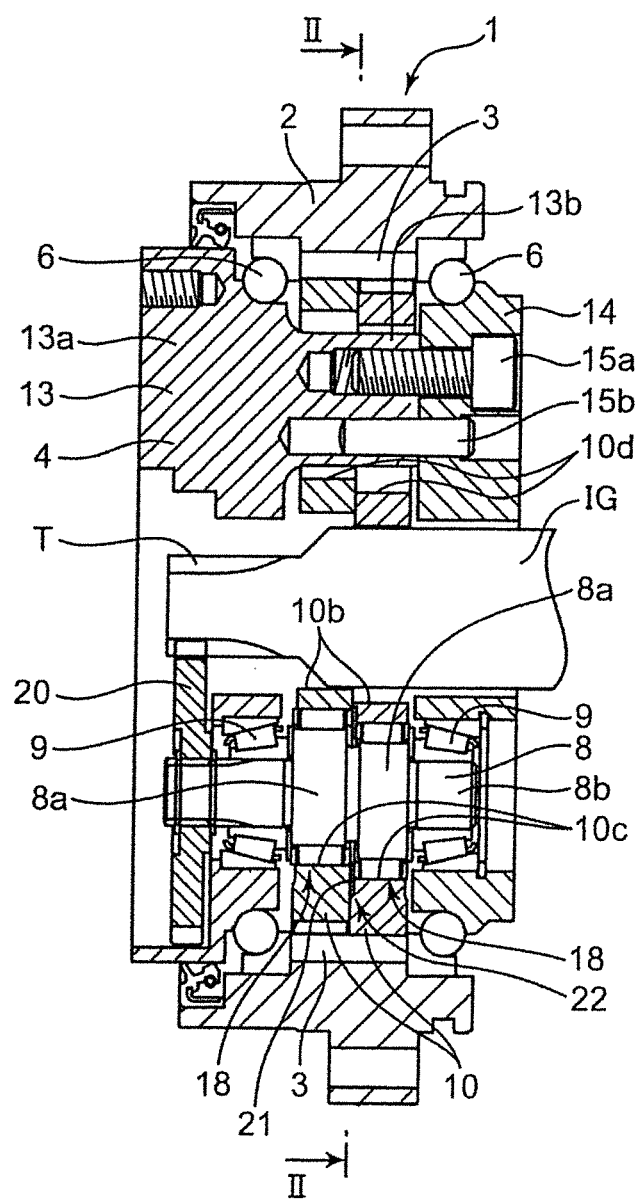
FIG. 1 is a cross section of the gear unit according to the first embodiment of the present invention.

The gear unit 1 according to the first embodiment shown in FIG. 1 transmits torque between a pair of partner members (for example, between a revolving superstructure and a base).

Figure 2:
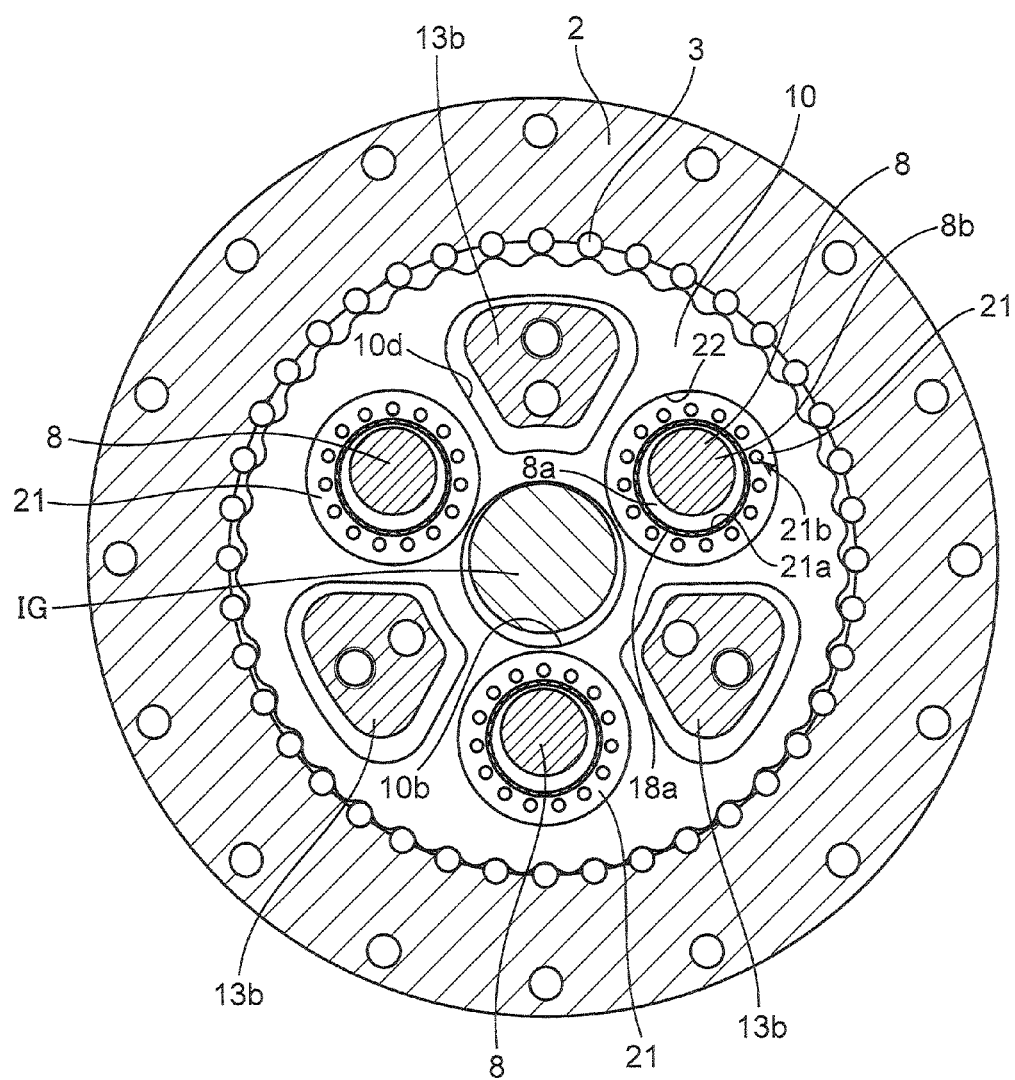
FIG. 2 is a cross section of line II-II shown in FIG. 1.

The gear unit 1 of the first embodiment comprises, as shown in FIGS. 1 and 2, an outer cylinder 2, an internal gear pin 3, a carrier 4, main bearings 6, crank shafts 8, crank bearings 9, two oscillating gears 10, two needle bearings 18, crank shaft gears 20, and washers 21.

The outer cylinder 2 is formed in a substantial cylindrical shape, and functions as a case which configures the outer face of the gear unit. The outer cylinder 2 is fastened, for example, to a base or the like of the robot with a bolt. A plurality of internal gear pins 3 are disposed on the inner face of the outer cylinder 2 at equal intervals in the peripheral direction of the outer cylinder 2. The internal gear pin 3 functions as internal teeth which engage with the oscillating gears 10 configured from external gears.

The carrier 4 is supported by a pair of main bearings 6, which are separated in the axial direction, so that the carrier 4 is relatively rotatable in relation to the outer cylinder 2. In addition, the carrier 4 comprises a base part 13, and an end plate part 14. The oscillating gears 10 are disposed between the base part 13 and the end plate part 14. The oscillating gear 10 is a transmission member for transmitting torque between the outer cylinder 2 and the carrier 4.

The base part 13 includes a substrate part 13a disposed near the end of the outer cylinder 2 within the outer cylinder 2, and a shaft part 13b extending in the axial direction from the substrate part 13a toward end plate part 14.

The end plate part 14 is disposed at the tip of the shaft part 13b of the base part 13. The end plate part 14 is fastened to the shaft part 13b with a bolt 15a and a pin 15b. The base part 13 and the end plate part 14 are thereby integrated.

The carrier 4 is fastened, for example, to the revolving superstructure or the like of the robot with a bolt. When the carrier 4 rotates relatively relative to the outer cylinder 2, the revolving superstructure turns relatively relative to the partner member such as the base. Note that the mounting targets of the outer cylinder 2 and the carrier 4 may be mutually exchanged; specifically, the outer cylinder 2 can be fastened to the revolving superstructure and the base part 13 of the carrier 4 may be fastened to the base.

A plurality of (in FIG. 2, three) crank shafts 8 are provided inside the carrier 4. The respective crank shafts 8 are disposed at equal intervals in the peripheral direction of the input gear IG around the input gear IG, which inputs, into the gear unit 1, the rotational drive force transmitted from the motor or the like. Crank shaft gears 20 are respectively mounted on the end of the respective crank shafts 8. The respective crank shaft gears 20 are engaged with the external teeth T of the input gear IG. The respective crank shaft gears 20 transmit the rotation of the input gear IG to the crank shafts 8 onto which the crank shaft gears 20 are mounted. In addition, the crank shafts 8 are each mounted on the carrier 4, so that it can rotate around the axis of the carrier 4, via a pair of crank bearings 9. In other words, the crank shafts 8 are rotatably supported by the carrier 4.

The crank shaft 8 includes two eccentric parts 8a, and a shaft part 8b. Both ends of the shaft part 8b are rotatably supported by a pair of crank bearings 9. The plurality of eccentric parts 8a are disposed next to each other in the axial direction in a state of being decentered relative to the shaft part 8b between the pair of crank bearings 9. The eccentric parts 8a are each formed in a cylindrical shape which is decentered from the shaft center of the crank shaft 8 at predetermined eccentricity. In addition, the eccentric parts 8a are each formed on the crank shaft 8 so as to mutually have a phase difference of a predetermined angle.

The two oscillating gears 10 are respectively mounted on the respective eccentric parts 8a of the crank shaft 8 via the needle bearing 18. The oscillating gear 10 is an external gear having an external diameter that is slightly smaller than the internal diameter of the outer cylinder 2. The number of external teeth of the oscillating gear 10 is slightly smaller than the number of internal gear pins 3. The oscillating gear 10 oscillates and rotates while engaging with the internal gear pins 3 disposed on the inner side of the outer cylinder 2 in conjunction with the eccentric rotation of the eccentric part 8a when the crank shaft 8 rotates.

The oscillating gear 10 includes a center part through-hole 10b, a plurality of eccentric part insertion holes 10c, and a plurality of shaft part insertion holes 10d. The input gear IG is inserted through the center part through-hole 10b with some looseness.

The eccentric part insertion holes 10c are provided in equal intervals in the peripheral direction of the center part through-holes 10b around the center part through-holes 10b in the oscillating gear 10. The eccentric part 8a of the respective crank shafts 8 is inserted through each of the eccentric part insertion holes 10c. The needle bearing 18 is disposed between the respective eccentric parts 8a and the inner peripheral face of the eccentric part insertion holes 10c.

The shaft part insertion holes 10d are provided in equal intervals in the peripheral direction of the center part through-holes 10b around the center part through-holes 10b in the oscillating gear 10. The shaft part insertion holes 10d are each disposed at a position between the eccentric part insertion holes 10c in the peripheral direction of the center part through-hole 10b. The respective shaft parts 13b of the carrier 4 is inserted through each of the shaft part insertion holes 10d with some looseness.

The needle bearing 18 is provided to the respective eccentric parts 8a of the crank shaft 8. The needle bearing 18 supports the oscillating gear 10 so that it is relatively rotatable in relation to the eccentric part 8a of the crank shaft 8 on the inner peripheral face of the eccentric part insertion holes 10c of the oscillating gear 10.

Figure 3:
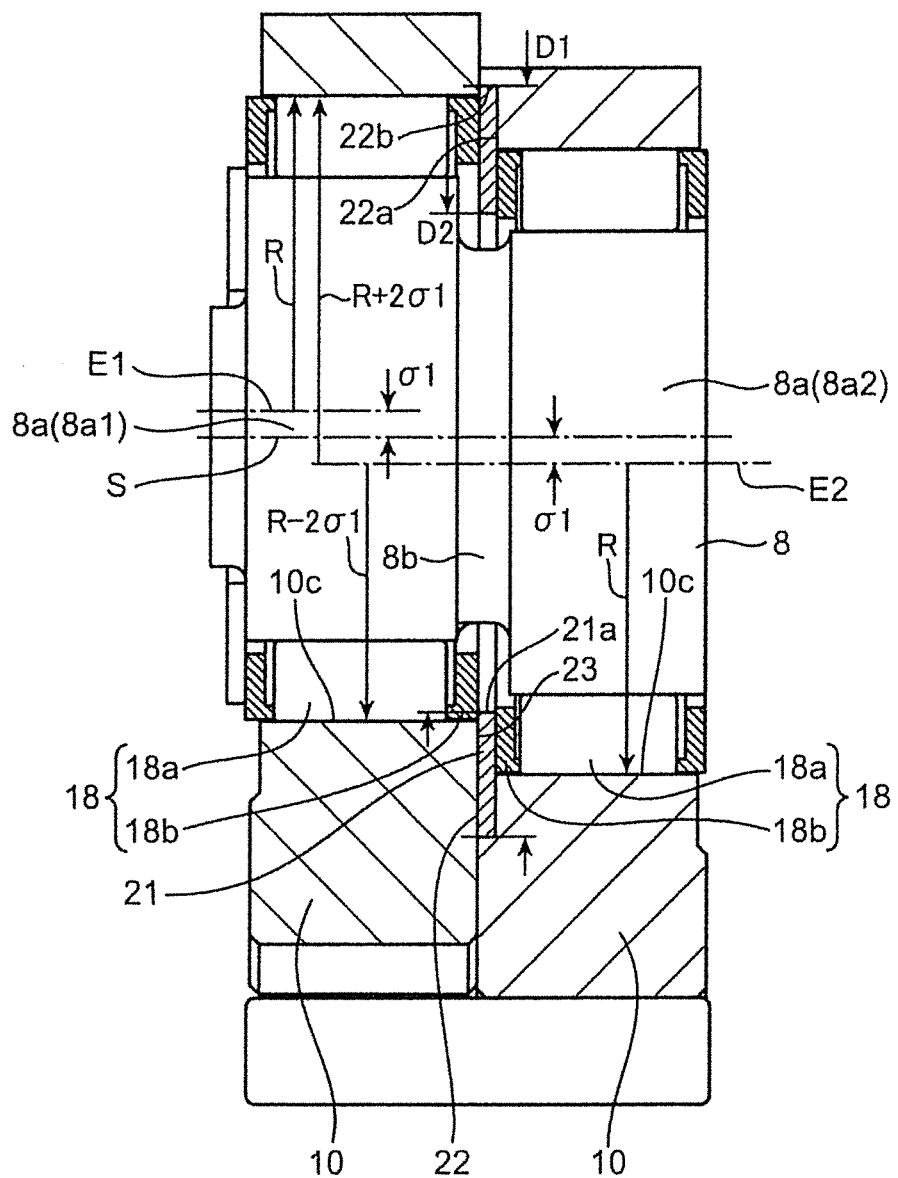
FIG. 3 is an enlarged cross section near the washer and the housing recess shown in FIG. 1.

The needle bearing 18 comprises, as shown in FIG. 3, needles 18a, and a retainer 18b for rollably retaining the needle 18a between the oscillating gear 10 and the eccentric part 8a. The needle bearing 18 is included in the concept of the roller bearing of the present invention. Moreover, the needle 18a is a needle-shaped roller, and is a concept that is included in the rollable rolling element in the present invention.

The washer 21 is a thin disk-shaped member, and is produced from metal, resin or the like.

The washer 21 has, at its center, a circular insertion hole 21a having an external diameter that is the same as or slightly larger than the external diameter of the eccentric part 8a of the crank shaft 8 as shown in FIGS. 2 and 3.

Lubrication holes 21b, which enable a lubricating oil as a lubricant to flow and pass therethrough, are formed at a position around the insertion hole 21a of the washer 21 by penetrating the washer 21 in the thickness direction.

As shown in FIGS. 1 to 3, a housing recess 22 which houses the washer 21 is formed on one face of the faces facing each other of the two adjacent oscillating gears 10.

The housing recess 22 has a depth that is the same as or similar to the thickness of the washer 21. Moreover, the housing recess 22 has an inner peripheral diameter that is the same as or similar to the external diameter of the washer 21. The housing recess 22 is formed at a position so that the eccentric part 8a, the needle bearing 18 and the washer 21 are coaxial in the oscillating gear 10 on which the housing recess 22 is formed.

The washer 21 is housed in the housing recess 22 so as to become flush with the end face, in the axial direction, of the oscillating gear 10 on which the housing recess 22 is formed.

The housing recess 22 includes, as shown in FIG. 3, an axial direction regulating surface 22a, and a radial direction regulating surface 22b.

The axial direction regulating surface 22a is a face that configures the bottom face of the housing recess 22, and the normal direction of the axial direction regulating surface 22a is parallel to the extending direction of a shaft center S of the crank shaft 8. The axial direction regulating surface 22a regulates a movement of the washer 21 in the axial direction by coming into contact with the washer 21 in the extending direction of the shaft center S.

The radial direction regulating surface 22b is a face that configures the inner peripheral face of the housing recess 22, and rises from the outer peripheral edge of the axial direction regulating surface 22a in the extending direction of the shaft center S. The radial direction regulating surface 22b regulates the movement of the washer 21 in the radial direction by coming into contact with the outer peripheral face of the washer 21.

The external diameter D1 of the washer 21 is set as follows. As shown in FIG. 3, the eccentricities, from the shaft center S, of the two eccentric parts 8a (indicated as 8a1, 8a2 in FIG. 3 for easily differentiating the two eccentric parts) in the crank shaft 8 are respectively $\sigma1$, the distance from the eccentric shaft E1 of one eccentric part 8a1 to the outer peripheral end of the retainer 18b of the needle bearing 18 and the distance from the eccentric shaft E2 of the other eccentric part 8a2 to the outer peripheral end of the retainer 18b of the needle bearing 18 are respectively R, and, when the washer 21 is disposed coaxially with the eccentric shaft E2 of the other eccentric part 8a2, the external diameter D1 of the washer 21 is set to be double of $(R+2\sigma1)$ or more. Consequently, regardless of the angle of the one eccentric part 8a1, the outer peripheral end of the retainer 18b of the needle bearing 18 provided to the eccentric part 8a1 will be within the range of the external diameter D1 of the washer 21.

Moreover, the internal diameter D2 of the washer 21 is set to be double of $(R-2\sigma1)$ or less. Consequently, regardless of the angle of the one eccentric part 8a1, the outer peripheral end of the retainer 18b of the needle bearing 18 provided to the eccentric part 8a1 will be within the range between the internal diameter D2 and the external diameter D1 of the washer 21.

Meanwhile, with regard to the relation of the outer peripheral end of the retainer 18b of the needle bearing 18 provided to the other eccentric part 8a2, and the washer 21, the distance from the eccentric shaft E2 to the outer peripheral end of the retainer 18b is R, the washer 21 and the retainer 18b are disposed coaxially in the eccentric shaft E2, and the relation of $(R+2\sigma1)>R>(R-2\sigma1)$ is constantly maintained. Accordingly, in the other eccentric part 8a2 also, the outer peripheral end of the retainer 18b will constantly be within the range between the internal diameter D2 and the external diameter D1 of the washer 21.

By setting the size of the washer 21 as described above, as shown in FIG. 3, the washer 21 can be provided at a position between the adjacent eccentric parts 8a capable of coming into contact with the retainer 18b of the needle bearing 18 provided respectively to the adjacent eccentric parts 8a, and can thereby regulate the movement of the needle bearing 18 in the axial direction.

Note that, so as long as the internal diameter D2 and the external diameter D1 of the washer 21 are set within the foregoing range, the outer peripheral end of the retainer 18b of one of the eccentric parts 8a1, 8a2 can constantly come into contact with the washer 21, but the present invention is not limited thereto. For example, so as long as the internal diameter D2 and the external diameter D1 of the washer 21 are set in a range in which the washer 21 can constantly come into contact with a part of the respective retainers 18b, even if the washer 21 is not constantly in contact with the entire face of the retainer 18b of one of the eccentric parts 8a1, 8a2, it is possible to regulate the movement of the respective needle bearings 18 in the axial direction.

As a result of the washer 21 coming into contact with the axial direction regulating surface 22a and the counterface surface 23 of the oscillating gear 10 facing the axial direction regulating surface 22a inside the housing recess 22, movement of the washer 21 in the axial direction is regulated, and, as a result of the washer 21 coming into contact with the radial direction regulating surface 22b, movement of the washer 21 in the radial direction is regulated. Accordingly, the washer 21 can oscillate integrally with the oscillating gear 10 on which the housing recess 22 is formed.

The operation of the gear unit 1 according to this embodiment is now explained.

The rotational drive force input from the motor M to the input gear IG is transmitted to the respective crank shaft gears 20. Consequently, the respective crank shafts 8 rotate around their respective axes.

In addition, the eccentric part 8a of the crank shaft 8 engages in eccentric rotation pursuant to the rotation of the respective crank shafts 8. Consequently, the two oscillating gears 10 oscillate and rotate while engaging with the internal gear pins 3 of the inner face of the outer cylinder 2 in conjunction with the eccentric rotation of the eccentric part 8a. The oscillating rotation of the two oscillating gears 10 is transmitted to the carrier 4 through the respective crank shafts 8. In this embodiment, since the outer cylinder 2 is immovable by being fixed to a base or the like, the carrier 4 can consequently rotate relatively in relation to the outer cylinder 2 at a rotating speed that is reduced from the input rotation. Here, the washer 21 housed in the housing recess 22 formed on one of the two oscillating gears 10 will oscillate integrally with the oscillating gear 10 on which the housing recess 22 is formed. The washer 21 can regulate the movement of the crank shaft 8 in the axial direction in the needle bearings 18 by oscillating and coming into contact with the respective retainers 18b of the needle bearings 18 provided to the respective eccentric parts 8a of the crank shaft 8.

Features of First Embodiment (1) With the gear unit 1 of the first embodiment, the washer 21 is disposed between the adjacent eccentric parts 8a of the crank shaft 8, and provided to a position capable of coming into contact with the retainer 18b of the needle bearing 18 provided to each of the adjacent eccentric parts 8a. Accordingly, as a result of the washer 21 coming into contact with the retainer 18b, it is possible to regulate the movement of the needle bearing 18 in the axial direction.

In addition, the housing recess 22 is formed on at least one face of the faces facing each other of the two adjacent oscillating gears 10, and the washer 21 is inserted into the housing recess 22. It is thereby possible to reduce the space occupied by the washer 21 in the axial direction of the crank shaft 8.

Furthermore, as a result of the washer 21 coming into contact with the axial direction regulating surface 22a within the housing recess 22, movement of the washer 21 in the axial direction is regulated, and, as a result of the washer 21 coming into contact with the radial direction regulating surface 22b, movement of the washer 21 in the radial direction is regulated. It is thereby possible to regulate the movement of the washer 21 itself in the axial direction and the radial direction.

(2) In addition, with the gear unit 1 of the first embodiment, since the housing recess 22 is formed on one oscillating gear 10, production is enabled with fewer production processes, and it is possible to reduce the production cost.

(3) Moreover, with the gear unit 1 of the first embodiment, the washer 21 is housed within a range in the axial direction of the oscillating gear 10 on which the housing recess 22 is formed and, for example, is housed to be flush with the axial direction end face of the oscillating gear 10 on which the housing recess 22 is formed. Consequently, since the washer 21 will not protrude from the axial direction end face in the oscillating gear 10, it is possible to reliably reduce the space occupied by the washer 21 in the axial direction of the crank shaft 8.

Note that, even if the washer 21 protrudes slightly from the housing recess 22 and is not flush with the axial direction end face of the oscillating gear 10 on which the housing recess 22 is formed, it is still possible to prevent, using the washer 21, the interference of the retainers 18b of the adjacent needle bearings 18.

(4) Moreover, with the gear unit 1 of the first embodiment, since the washer 21 includes lubrication holes 21b through which a lubricant such as oil can pass and flow therethrough, which are formed in the thickness direction thereof, the lubricant can flow smoothly through the lubrication hole 21b, and the lubricity of the lubricant will improve.

Note that, with the first embodiment described above, explained was a case of the gear unit 1 comprising two eccentric parts 8a, but the same effect as the first embodiment can be yielded in cases of comprising three or more eccentric parts 8a.

Moreover, while the first embodiment described above illustrated a gear unit 1 having a structure in which a plurality of crank shafts 8 are disposed around the input gear IG, the present invention is not limited thereto, and, as described in the third embodiment explained later, it is also possible to adopt a so-called center crank-type gear unit in which one crank shaft 108 is disposed along the shaft center of the gear unit.

Second Embodiment

In the foregoing embodiment, while the housing recess 22 is formed on one oscillating gear 10 of the two adjacent oscillating gears 10, the present invention is not limited thereto, and one housing recess may also be formed across two oscillating gears 10 (in other words, across two oscillating gears 10).

Figure 4:
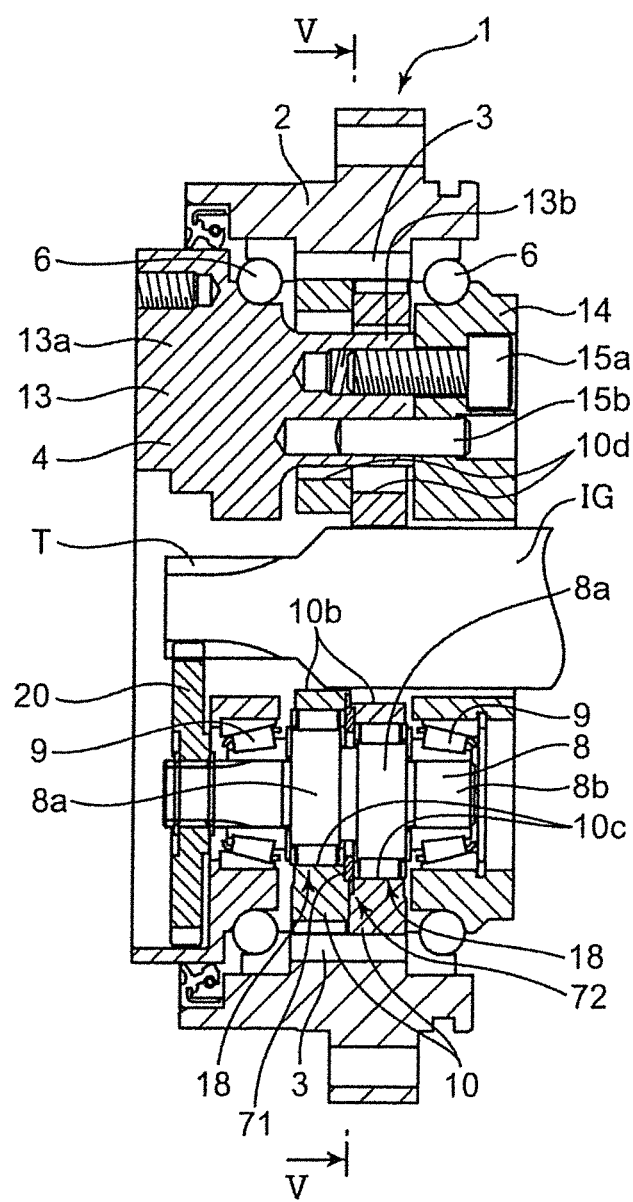
FIG. 4 is a cross section of the gear unit according to the second embodiment of the present invention.
Figure 5:
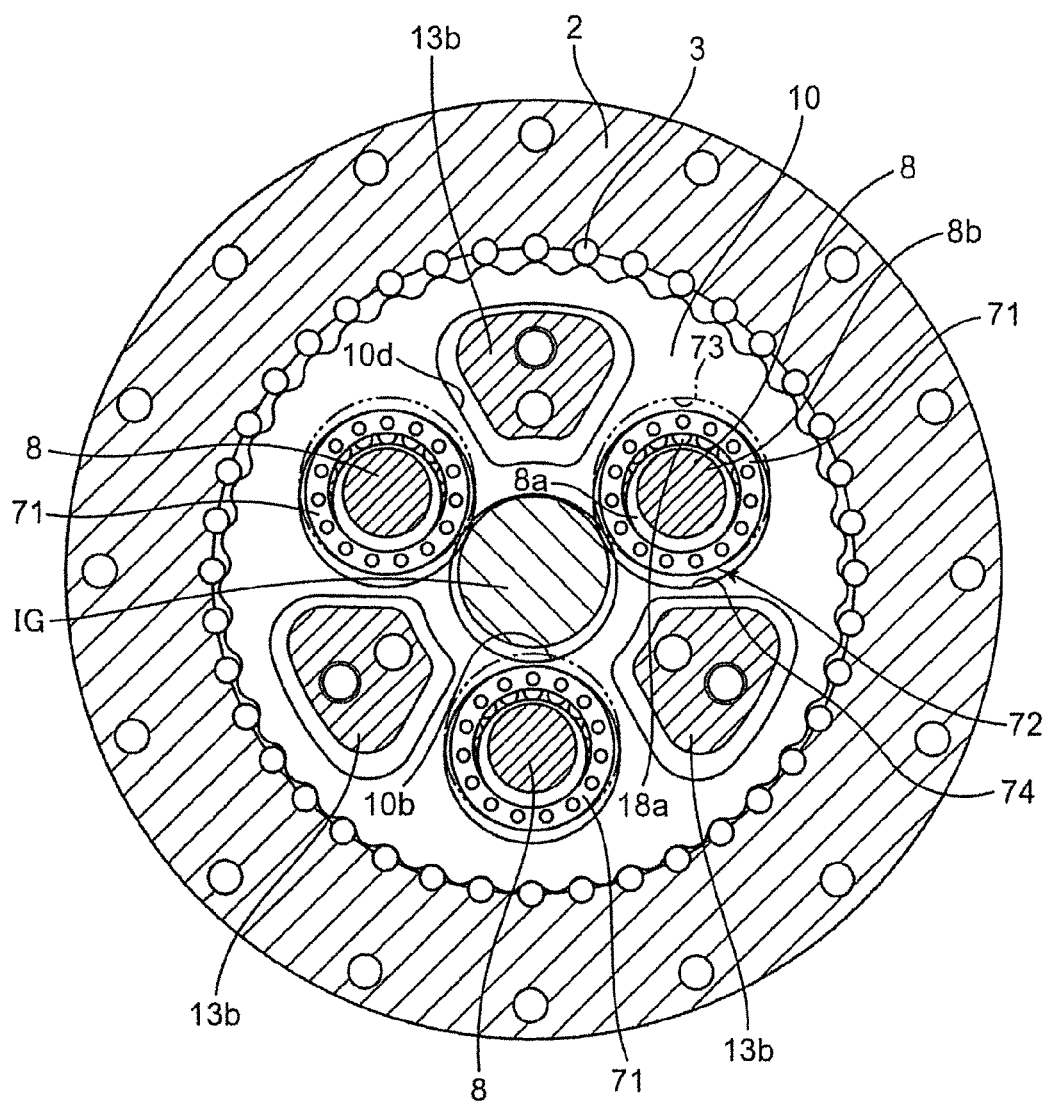
FIG. 5 is a cross section of line V-V shown in FIG. 4.
Figure 6:
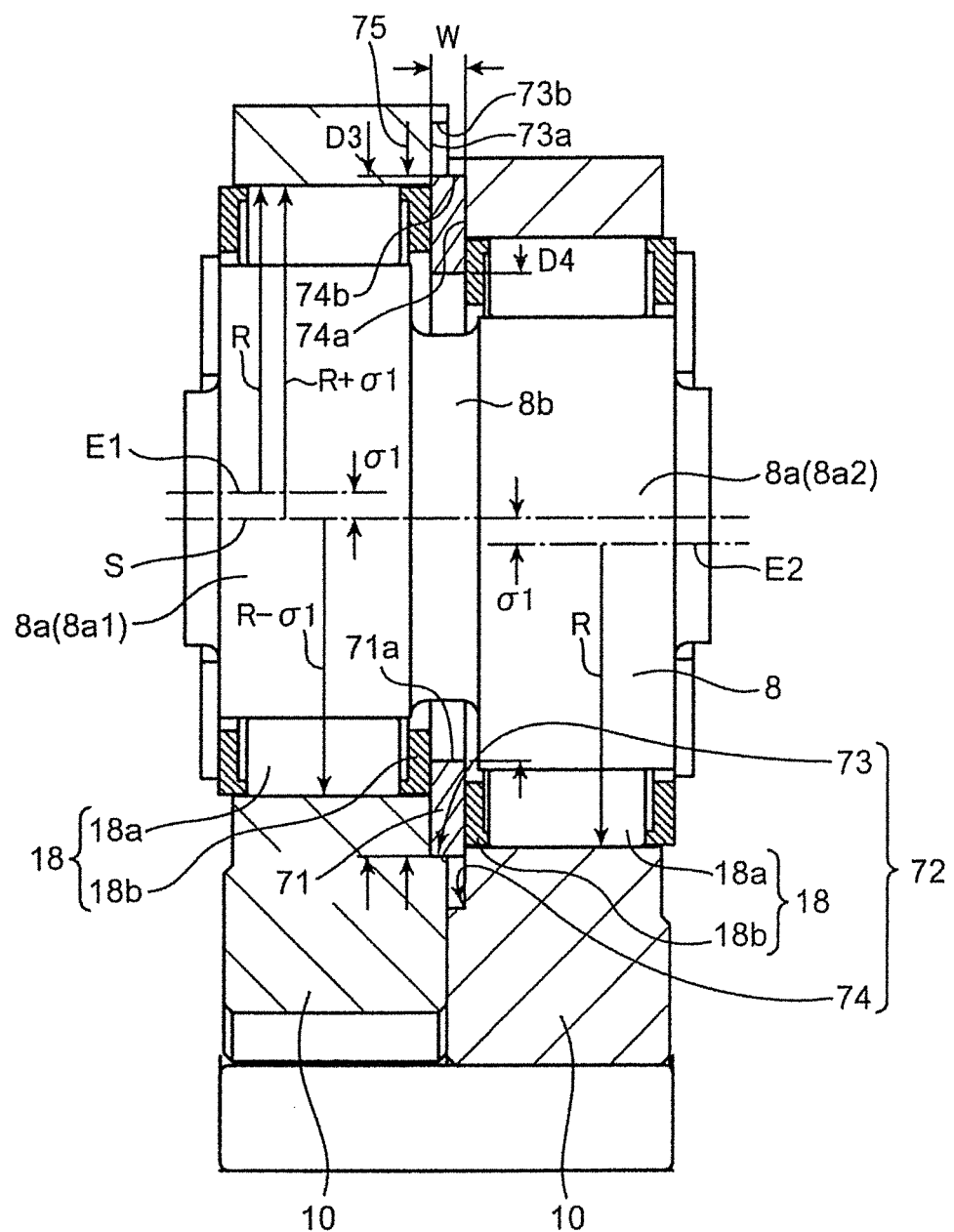
FIG. 6 is an enlarged cross section near the washer and the housing recess shown in FIG. 4.

In other words, as shown in FIGS. 4 to 6, the gear unit 1 of the second embodiment differs from the gear unit 1 shown in FIGS. 1 to 3 with respect to the point that the disk-shaped washer 71 is housed in the housing recess 72 formed across two adjacent oscillating gears 10, and has a common configuration with respect to the remaining points.

Specifically, with the gear unit of the second embodiment, the housing recess 72 is configured, as shown in FIG. 6, from a first recess 73 formed on one face of the faces facing each other of the two adjacent oscillating gears 10, and a second recess 74 formed on the other face of the faces facing each other of the two adjacent oscillating gears 10.

The housing recess 72 is formed as a result of the two adjacent oscillating gears 10 facing each other and the first recess 73 and the second recess 74 being in communication. In other words, the first recess 73 and the second recess 74 are formed as though the overlapping portion exists in a view of the axial direction of the oscillating gear 10. The first recess 73 and the second recess 74 are respectively formed, as shown in FIG. 5, as a recess that takes on a circular shape in a view of the axial direction, and have the same sizing. The first recess 73 and the second recess 74 are decentered, as shown in FIG. 6, in a direction of being mutually shifted 180 degrees from the shaft center S of the crank shaft 8. The disk-shaped washer 71 can be housed coaxially with the shaft part 8b of the crank shaft 8 in a range 75 in which the first recess 73 and the second recess 74 are overlapped in the radial direction of the washer 71. Accordingly, the center of the disk-shaped washer 71 in the axial direction coincides with the shaft center S of the crank shaft 8.

The first recess 73 and the second recess 74 respectively include, as shown in FIG. 6, axial direction regulating surfaces 73a, 74a, and radial direction regulating surfaces 73b, 74b.

The axial direction regulating surfaces 73a, 74a are faces that configure the respective bottom faces of the first recess 73 and the second recess 74, the normal directions thereof are respectively parallel to the extending direction of the shaft center S, and are formed to be parallel to each other. The axial direction regulating surfaces 73a, 74a regulate the movement of the washer 71 in the axial direction by coming into contact with washer 71 from either side of the washer 71 from the extending direction of the shaft center S of the crank shaft 8.

The radial direction regulating surfaces 73b, 74b are faces that configure the respective inner peripheral faces of the first recess 73 and the second recess 74, and respectively rise from the outer peripheral edge of the axial direction regulating surfaces 73a, 74a in the extending direction of the shaft center S. The radial direction regulating surfaces 73b, 74b regulate the movement of the washer 71 in the radial direction by coming into contact with the outer peripheral face of the washer 71.

The first recess 73 and the second recess 74 are disposed to face each other at a mutually displaced position in the radial direction of the washer 71 so as to correspond to the eccentric parts 8a supporting the oscillating gear 10. Consequently, while the respective inner faces of the first recess 73 and the second recess 74 are mutually decentered, regardless of the angle of rotation of the crank shaft 8, they have a shape capable of coming into contact with the washer 21.

Specifically, as shown in FIG. 6, the entire width W (in other words, distance between the axial direction regulating surfaces 72a, 73a) of the housing recess 72 formed by the first recess 73 and the second recess 74 is set to be the same as or slightly larger than the thickness of the washer 71. Moreover, the distance in the radial direction of the range 75 in which the first recess 73 and the second recess 74 overlap in the radial direction of the washer 71 is set to be the same as or slightly larger than the external diameter D3 of the washer 71. Consequently, the washer 71 is retained, as shown in FIG. 6, at a diagonal position by the respective inner faces of the first recess 73 and the second recess 74. Movement of the washer 71 in the axial direction and the radial direction is thereby regulated. Consequently, while the two oscillating gears 10 oscillate together with the respective eccentric parts 8a when the crank shaft 8 rotates, the washer 71 can rotate around the shaft center S of the crank shaft 8 as a center in a state of being housed in the range 75 in which the first recess 73 and the second recess 74 are overlapped in the radial direction of the washer 71.

The external diameter D3 of the washer 71 is set as follows. As shown in FIG. 6, the eccentricity from the shaft S of the two eccentric parts 8a in the crank shaft 8 is σ1, the distance from the eccentric shaft E1 of one eccentric part 8a1 to the outer peripheral end of the retainer 18b of the needle bearing 18 and the distance from the eccentric shaft E2 of the other eccentric part 8a2 to the outer peripheral end of the retainer 18b of the needle bearing 18 are respectively R, and, when the washer 71 is disposed coaxially with the shaft center S of the crank shaft 8, the external diameter D3 of the washer 71 is set to be double of (R+σ1) or more. Consequently, regardless of the angle of the eccentric parts 8a1, 8a2, the outer peripheral end of the retainer 18b of the needle bearing 18 provided respectively to the eccentric parts 8a1, 8a2 will be within the range of the external diameter D3 of the washer 71.

Moreover, the internal diameter D4 of the washer 71 is set to be double of (R−σ1) or less. Consequently, regardless of the angle of both eccentric parts 8a1, 8a2, the outer peripheral end of the retainer 18b of the needle bearing 18 provided respectively to the eccentric parts 8a1, 8a2 will be within the range between the internal diameter D4 and the external diameter D3 of the washer 71.

By setting the size of the washer 71 as described above, as shown in FIG. 6, the washer 71 can be provided at a position between the adjacent eccentric parts 8a capable of coming into contact with the retainer 18b of the needle bearing 18 provided respectively to the adjacent eccentric parts 8a, and can thereby regulate the movement of the needle bearing 18 in the axial direction.

Features of Second Embodiment (1) With the gear unit 1 of the second embodiment configured as described above, the housing recess 72 comprises a first recess 73 formed on one face of the faces facing each other of the two adjacent oscillating gears 10, and a second recess 74 formed on the other face, and are formed by the two adjacent oscillating gears 10 facing each other and the first recess 73 and the second recess 74 being in communication.

Consequently, as with embodiment 1 above, the washer 71 is disposed between the adjacent eccentric parts 8a of the crank shaft 8, and provided at a position capable of coming into contact with the retainer 18b of the needle bearing 18 provided respectively to the adjacent eccentric parts 8a. Accordingly, the washer 71 can regulate the movement of the needle bearing 18 in the axial direction by coming into contact with the retainer 18b.

In addition, the housing recess 72 is formed across faces facing each other of the two adjacent oscillating gears 10, and the washer 71 is inserted into the housing recess 72. It is thereby possible to reduce the space occupied by the washer 71 in the axial direction of the crank shaft 8.

Furthermore, movement of the washer 71 in the axial direction is regulated by the washer 71 coming into contact with the axial direction regulating surfaces 73a, 74a inside the housing recess 72. Furthermore, movement of the washer 71 in the radial direction is regulated by the washer 71 coming into contact with the radial direction regulating surfaces 73b, 74b. It is thereby possible to regulate the movement of the washer 71 itself in the axial direction and the radial direction.

(2) In addition, in the second embodiment, one housing recess 72 is formed across two adjacent oscillating gears 10, and the sizing of the first recess 73 and the sizing of the second recess 74 configuring the housing recess 72 are the same. Consequently, it will suffice to prepare oscillating gears 10 having a recess of a common sizing upon assembling the gear unit, and product management is simplified.

Note that, in the second embodiment, while an example of the first recess 73 and the second recess 74 having the same sizing was illustrated, the present invention is not limited thereto, and the sizing of the first recess 73 and the sizing of the second recess 74 may be mutually different.

Moreover, in the foregoing second embodiment also, as with the first embodiment, explained was a case of the gear unit 1 comprising two eccentric parts 8a, but the same effect as the second embodiment can be yielded in cases of comprising three or more eccentric parts 8a.

Moreover, as with the first embodiment, while the second embodiment described above illustrated a gear unit 1 having a structure in which a plurality of crank shafts 8 are disposed around the input gear IG, the present invention is not limited thereto, and, as described in the third embodiment explained later, it is also possible to adopt a so-called center crank-type gear unit in which one crank shaft 108 is disposed along the shaft center of the gear unit.

Third Embodiment

In the first and second embodiments described above, while the housing recess is formed on one or both of the counterface surfaces of the two oscillating gears 10, the present invention is not limited thereto. In other words, even with a gear unit comprising three or more oscillating gears, it is possible to form a housing recess for housing a washer and house the washer therein.

Figure 7:
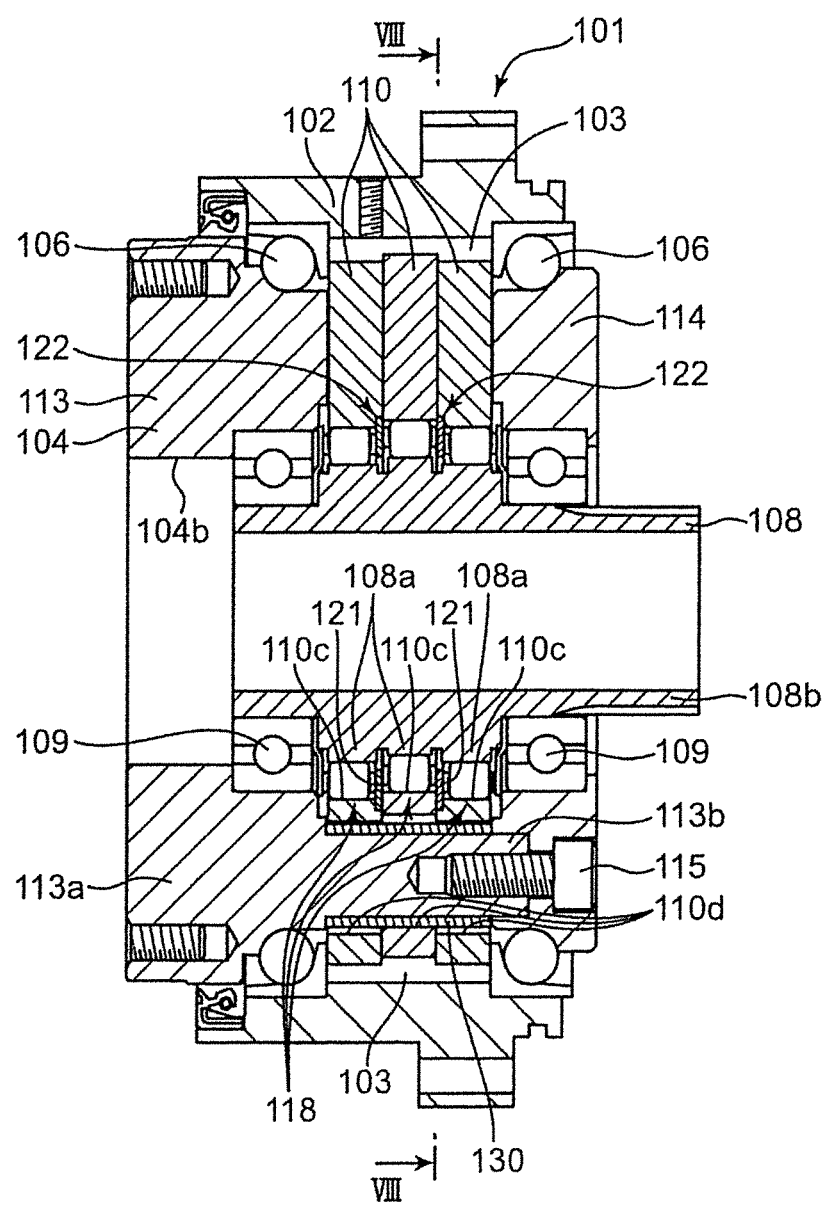
FIG. 7 is a cross section of the gear unit according to the third embodiment of the present invention.
Figure 8:
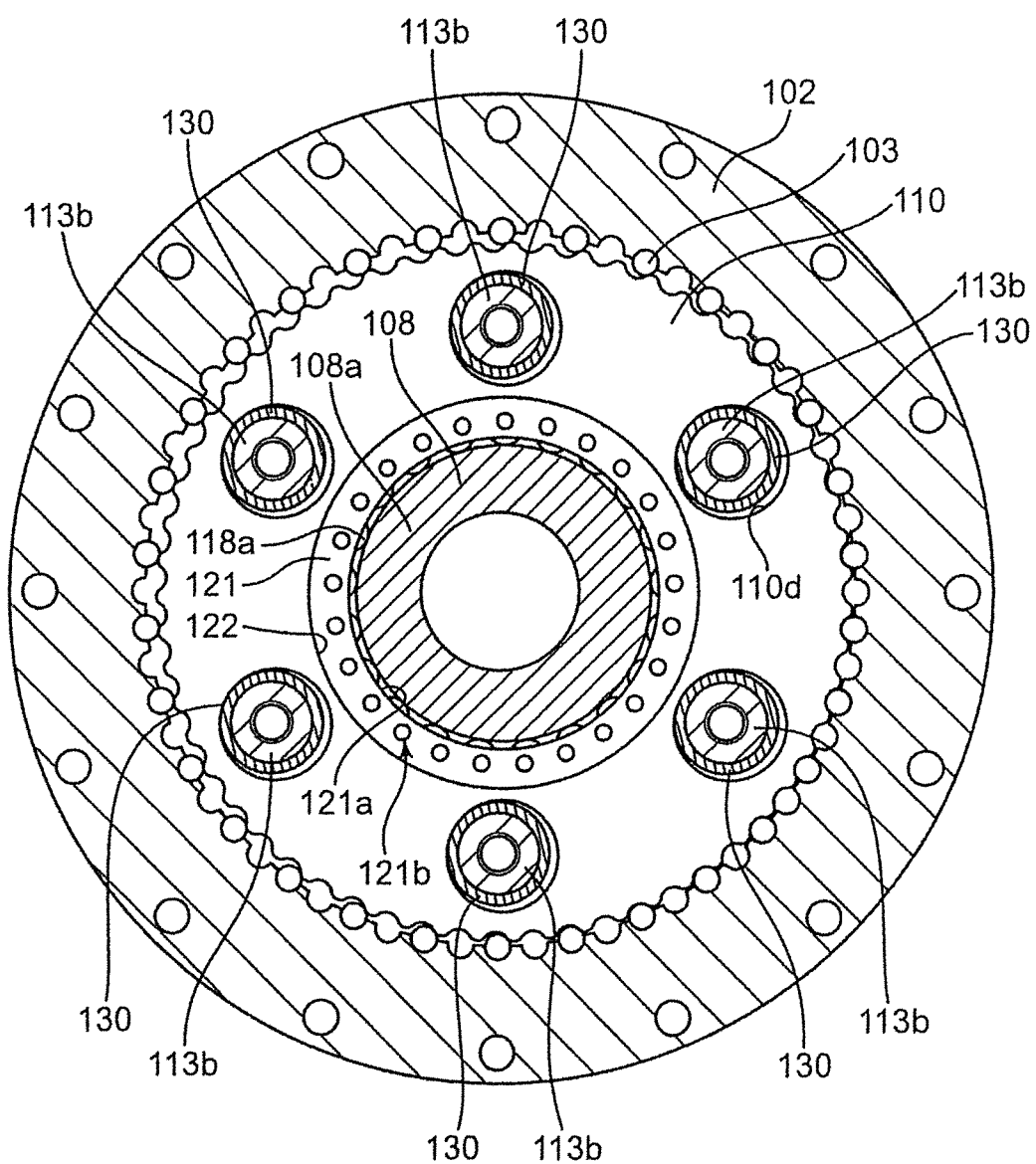
FIG. 8 is a cross section of line VIII-VIII shown in FIG. 7.
Figure 9:
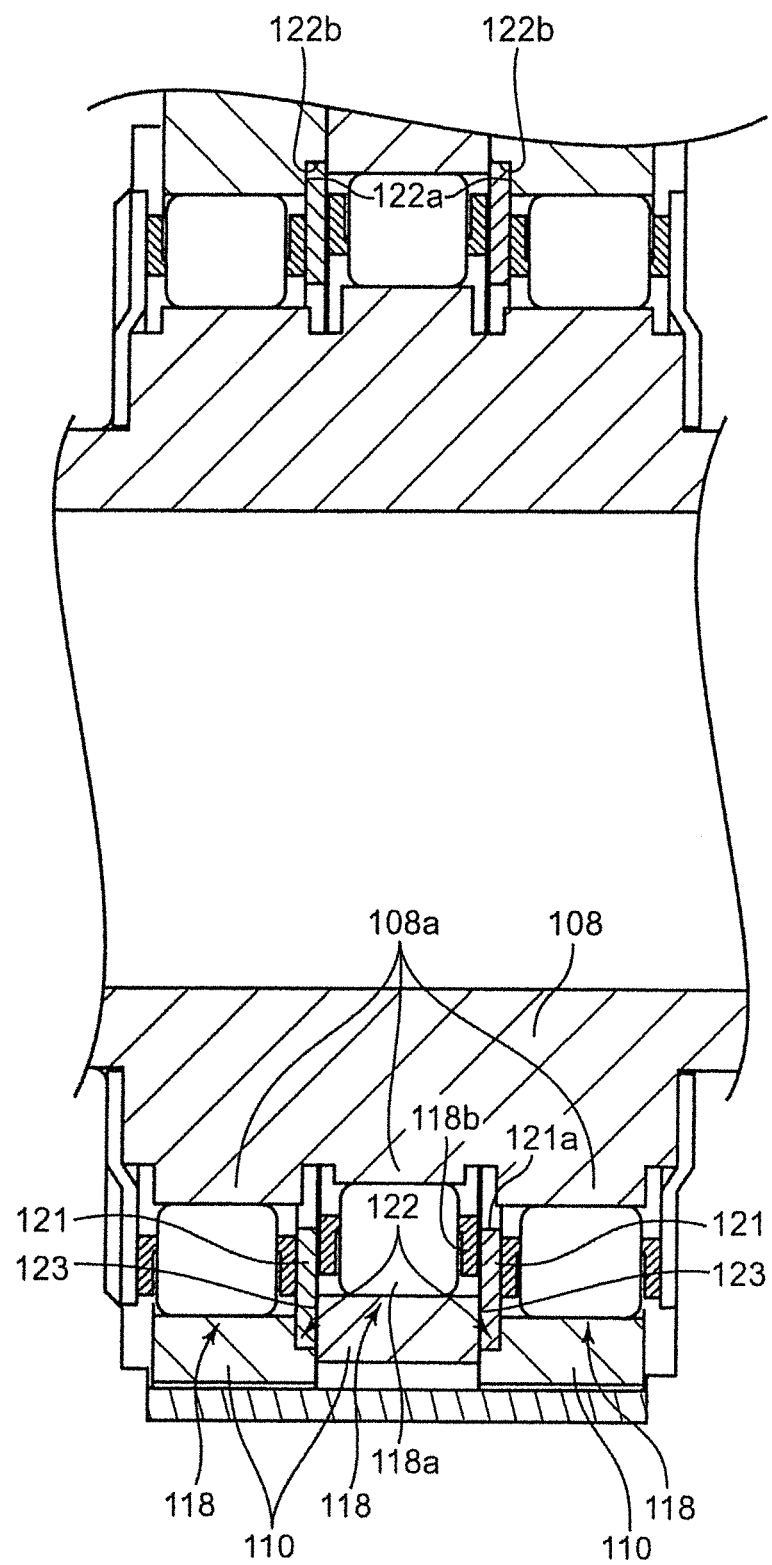
FIG. 9 is an enlarged cross section near the washer and the housing recess shown in FIG. 7.

In other words, as shown in FIGS. 7 to 9, the gear unit 101 of the third embodiment is a so-called center crank-type gear unit in which one crank shaft 108 is disposed along the shaft center of the gear unit, and comprises an outer cylinder 102, internal gear pins 103, a carrier 104, main bearings 106, one crank shaft 108, crank bearings 109, three oscillating gears 110, three needle bearings 118, and two washers 121.

The outer cylinder 102 is formed in a substantial cylindrical shape as with embodiment 1 described above, and functions as a case which configures the outer face of the gear unit. The outer cylinder 102 is fastened, for example, to a base or the like of the robot with a bolt. A plurality of internal gear pins 103 are disposed on the inner face of the outer cylinder 102 at equal intervals in the peripheral direction of the outer cylinder 102. The internal gear pin 103 functions as internal teeth which engage with the oscillating gears 110 configured from external gears.

The carrier 104 is supported by a pair of main bearings 106, which are separated in the axial direction, so that the carrier 104 is relatively rotatable in relation to the outer cylinder 102. In addition, the carrier 104 comprises a base part 113, and an end plate part 114. Disposed between the base part 113 and the end plate part 114 are oscillating gears 110 which are transmission members for transmitting torque between the outer cylinder 102 and the carrier 104.

The base part 113 includes a substrate part 113a disposed near the end of the outer cylinder 102 within the outer cylinder 102, and a shaft part 113b extending in the axial direction from the substrate part 113a toward end plate part 114.

The end plate part 114 is disposed at the tip of the shaft part 113b of the base part 113. The end plate part 114 is fastened to the shaft part 113b with a bolt 115. The base part 113 and the end plate part 114 are thereby integrated.

One crank shaft 108 is housed in a through-hole 104b formed at the center of the carrier 4. The crank shaft 108 can directly receive the rotational drive force transmitted from a motor or the like. The crank shaft 108 is rotatably supported by the carrier 104 via a pair of crank bearings 109.

The crank shaft 108 includes three eccentric parts 108a, and a shaft part 108b. Both ends of the shaft part 108b are rotatably supported by the pair of crank bearings 109.

The three eccentric parts 108a are disposed next to each other in the axial direction in a state of being decentered relative to the shaft part 108b between the pair of crank bearings 109. The eccentric parts 108a are each formed in a cylindrical shape which is decentered from the shaft center of the crank shaft 108 at predetermined eccentricity. In addition, the eccentric parts 108a are each formed on the crank shaft 108 so as to mutually have a phase difference of a predetermined angle.

The three oscillating gears 110 comprise external gears as with the first and second embodiments described above, and respectively mounted on the respective eccentric parts 108a of the crank shaft 108 via the needle bearing 118. The oscillating gear 110 has an external diameter that is slightly smaller than the internal diameter of the outer cylinder 102. The oscillating gear 110 oscillates and rotates while engaging with the internal gear pins 103 disposed on the inner side of the outer cylinder 102 in conjunction with the eccentric rotation of the eccentric part 108a when the crank shaft 108 rotates.

The oscillating gear 110 includes one eccentric part insertion hole 110c formed at the center thereof, and a plurality of shaft part insertion holes 110d.

The eccentric part 108a of the respective crank shafts 108 is inserted through each of the respective eccentric part insertion hole 110c. The needle bearing 118 is disposed between the respective eccentric parts 108a and the inner peripheral face of the eccentric part insertion hole 110c.

The shaft part insertion holes 110d are provided at equal intervals in the peripheral direction around the eccentric part insertion hole 110c in the oscillating gear 110. Each of the shaft parts 113b of the carrier 4 is inserted through each of the shaft part insertion holes 110d with some looseness between the shaft part and the inner peripheral face of the shaft part insertion holes 110d in a state of being covered by the cylindrical member 130.

With the gear unit 101 of the third embodiment, the needle bearing 118 is provided to the respective eccentric parts 108a of the crank shaft 108, and the oscillating gear 110 is rotatably supported relative to the eccentric part 108a of the crank shaft 108 on the inner peripheral face of the eccentric part insertion holes 110c of the oscillating gear 110.

The needle bearing 118 comprises, as shown in FIG. 9, needles 118a, and a retainer 118b for rollably retaining the needle 118a between the oscillating gear 110 and the eccentric part 108a.

The washer 121 is a thin disk-shaped member, and is produced from metal, resin or the like.

The washer 121 has, at its center, a circular insertion hole 121a having an external diameter that is the same as or slightly larger than the external diameter of the eccentric part 108a of the crank shaft 108.

In addition, lubrication holes 121b, which enable a lubricating oil as a lubricant to flow and pass therethrough, are formed at a position around the insertion hole 121a of the washer 121 by penetrating the washer 121 in the thickness direction.

The washer 121 is provided at a position between the three adjacent eccentric parts 108a capable of coming into contact with the retainer 118b of the needle bearing 118 provided respectively to the adjacent eccentric parts 108a, and can thereby regulate the movement of the needle bearing 118 in the axial direction. In other words, the washers 121 are disposed respectively between the three eccentric parts 108a of the crank shaft 108 disposed at the center of the carrier 4. In other words, two washers 121 are disposed in the third embodiment.

The housing recesses 122 for housing the washers 121 are respectively formed on the faces facing each other of the adjacent oscillating gears 110 and which are the inner faces of the two oscillating gears 110, which are on the outside among the three oscillating gears 110.

The respective housing recesses 122 have a depth that is the same as or similar to the thickness of the washer 121, and has an inner peripheral diameter that is the same as or similar to the external diameter of the washer 121. The respective housing recesses 122 are formed at a position so that the eccentric part 108a, the needle bearing 118 and the washer 121 are coaxial in the oscillating gear 110 on which the housing recesses 122 are formed.

The respective washers 121 are housed in the housing recesses 122 to become flush with the axial direction end face of the oscillating gear 110 on which the housing recesses 122 are formed.

As with the housing recess 22 of the first embodiment described above, the respective housing recesses 122 respectively include an axial direction regulating surface 122a which regulates a movement of the washer 121 in the axial direction by coming into contact with the washer 121 from the axial direction of the crank shaft 108, and a radial direction regulating surface 122b which regulates the movement of the washer 121 in the radial direction by coming into contact with the outer peripheral face of the washer 121.

As with the washer 21 of the first embodiment described above, inside the housing recesses 122, movement of the washer 121 in the axial direction is regulated by the washer 121 coming into contact with the axial direction regulating surface 122a and the counterface surface 123 of the oscillating gear 110 facing the axial direction regulating surface 122a inside the housing recess 122, and movement of the washer 121 in the radial direction is regulated by the washer 121 coming into contact with the radial direction regulating surface 122b, respectively.

Features of Third Embodiment (1) The gear unit 101 of the third embodiment is a gear unit comprising three oscillating gears 110. The two washers 121 are respectively disposed between the adjacent eccentric parts 108a of the crank shaft 108. With this kind of configuration also, as with the first and second embodiments described above, since the washers 121 are provided at a position capable of coming into contact with the retainer 118b of the needle bearing 118 provided respectively to the adjacent eccentric parts 108a, movement of the needle bearing 118 in the axial direction can be regulated by the washer 121 coming into contact with the retainer 118b.

In addition, the housing recesses 122 are respectively formed on the faces facing each other of the adjacent oscillating gears 110 and which are the faces of the oscillating gears 110, which are on the outside among the three oscillating gears 110, and the two washers 121 are respectively inserted into the housing recesses 122. It is thereby possible to reduce the space occupied by the washer 121 in the axial direction of the crank shaft 108.

Furthermore, as a result of the washer 121 coming into contact with the axial direction regulating surface 122a within the housing recess 122, movement of the washer 121 in the axial direction is regulated, and, as a result of the washer 121 coming into contact with the radial direction regulating surface 122b, movement of the washer 121 in the radial direction is regulated. It is thereby possible to regulate the movement of the washer 121 itself in the axial direction and the radial direction.

(2) In addition, with the gear unit 101 of the third embodiment, since the housing recesses 122 are formed on the oscillating gear 110 on either side of the three oscillating gears 110 and the housing recesses 122 are of the same sizing, product management is simplified.

(3) Moreover, with the gear unit 101 of the third embodiment, since the washer 121 includes lubrication holes 121b through which a lubricant such as oil can pass and flow therethrough, which are formed in the thickness direction thereof, the lubricant can flow smoothly through the lubrication hole 121b, and the lubricity of the lubricant will improve.

Modified Example (A) In the foregoing first to third embodiments, while a needle bearing including needle rollers (needles) and a retainer was explained as an example of a roller bearing, the present invention is not limited to the foregoing configuration, and the present invention can be applied to any eccentrically oscillating gear unit that comprises a roller bearing including rollable rolling elements and a retainer for retaining the rolling element.

The first to third embodiments described above are now summarized.

The foregoing gear unit is a gear unit for transmitting torque, at a predetermined reduction gear ratio, between a pair of partner members which are relatively and rotatably coupled to each other, comprising: an outer cylinder which can be fixed to one of the partner members; a plurality of internal gear pins which are mounted on an inner peripheral face of the outer cylinder; a carrier which is housed inside the outer cylinder and can be fixed to the other one of the partner members; a crank shaft which includes a shaft part rotatably supported by the carrier and a plurality of eccentric parts which are decentered relative to the shaft part; a plurality of oscillating gears which include through-holes of a size, in which the eccentric parts of the crank shaft can be inserted therethrough, and external teeth capable of engaging with the internal gear pin, and which are supported by the carrier so as to oscillate in conjunction with a rotation of the crank shaft; a plurality of roller bearings which are respectively provided to the plurality of eccentric parts of the crank shaft, and support the oscillating gear so that it is relatively rotatable in relation to the eccentric parts of the crank shaft on an inner peripheral face of the through-holes of the oscillating gear, and has rolling elements and a retainer which rollably retains the rolling element between the oscillating gear and the eccentric parts; and a washer which is provided at a position where the washer is able to come into contact with the retainer of the roller bearing provided to each of the adjacent eccentric parts, and which regulates a movement of the roller bearing in an axial direction, wherein a housing recess which houses the washer is formed on at least one face among faces of the adjacent oscillating gears that face each other, the washer is housed in the housing recess, and the housing recess includes an axial direction regulating surface which comes into contact with the washer from the axial direction of the crank shaft and regulates movement of the washer in the axial direction, and a radial direction regulating surface which comes into contact with an outer peripheral surface of the washer and regulates movement of a washer in the radial direction.

According to the foregoing configuration, since the washer is provided at a position of being able to come into contact with the retainer of the roller bearing provided to each of the adjacent eccentric parts, movement of the roller bearing in the axial direction can be regulated by causing the washer to come into contact with the retainer.

In addition, the housing recess is formed on at least one face among faces of the adjacent oscillating gears that face each other, and the washer is inserted into the housing recess. Thus, it is possible to reduce the space occupied by the washer in the axial direction of the crank shaft.

Furthermore, movement of the washer in the axial direction is regulated by the washer coming into contact with the axial direction regulating surface inside the housing recess. In addition, movement of the washer in the radial direction is regulated by the washer coming into contact with the radial direction regulating surface inside the housing recess. Accordingly, movement of the washer itself in the axial direction and the radial direction can be regulated.

Moreover, preferably, the housing recess is formed on one face among the faces of the adjacent oscillating gears that face each other.

According to the foregoing configuration, since the housing recess is formed in one oscillating gear, production is enabled with fewer production processes, and the production cost can thereby be lowered.

Preferably, the washer is housed within a range of the oscillating gear in an axial direction where the housing recess is formed.

According to the foregoing configuration, since there is no possibility of the washer protruding from the end face of the oscillating gear in the axial direction, it is possible to reliably reduce the space occupied by the washer in the axial direction of the crank shaft.

Moreover, preferably, the housing recess comprises a first recess which is formed on one face among the faces of the adjacent oscillating gears that face each other, and a second recess which is formed on another face among the faces of the adjacent oscillating gears that face each other, and the housing recess is formed by the adjacent oscillating gears facing each other and the first recess and the second recess being in communication.

According to the foregoing configuration, since housing recess is formed by the adjacent oscillating gears facing each other and the first recess and the second recess being in communication, by causing the sizing of the first recess and the second recess to be the same, it will suffice to prepare an oscillating gear having a recess of common sizing upon assembling the gear unit, and product management is thereby facilitated.

Moreover, preferably, the washer includes a through-hole which penetrates the washer in a thickness direction and can circulate a lubricant.

According to the foregoing configuration, since the washer includes a through-hole which penetrates the washer in a thickness direction and can circulate a lubricant, the lubricity of the lubricant is improved.

The invention claimed is:

1. A gear unit for transmitting torque, at a predetermined reduction gear ratio, between a pair of partner members which are relatively and rotatably coupled to each other, the gear unit comprising:

an outer cylinder which can be fixed to one of the partner members;

a plurality of internal gear pins which are mounted on an inner peripheral face of the outer cylinder;

a carrier which is housed inside the outer cylinder and can be fixed to the other one of the partner members;

a crank shaft which includes a shaft part rotatably supported by the carrier and a plurality of eccentric parts which are decentered relative to the shaft part;

a plurality of oscillating gears which include through-holes of a size, in which the eccentric parts of the crank shaft can be inserted therethrough, and external teeth capable of engaging with the internal gear pin, and which are supported by the carrier so as to oscillate in conjunction with a rotation of the crank shaft;

a plurality of roller bearings which are respectively provided to the plurality of eccentric parts of the crank shaft, and support the oscillating gear so that it is relatively rotatable in relation to the eccentric parts of the crank shaft on an inner peripheral face of the through-holes of the oscillating gear, and has rolling elements and a retainer which rollably retains the rolling element between the oscillating gear and the eccentric parts; and a washer which is provided at a position where the washer is able to come into contact with the retainer of the roller bearing provided to each of the adjacent eccentric parts, and which regulates a movement of the roller bearing in an axial direction, wherein a housing recess which houses the washer is formed on at least one face among faces of the adjacent oscillating gears that face each other, the washer is housed in the housing recess, and the housing recess includes an axial direction regulating surface which comes into contact with the washer from the axial direction of the crank shaft and regulates movement of the washer in the axial direction, and a radial direction regulating surface which comes into contact with an outer peripheral surface of the washer and regulates movement of the washer in a radial direction.

2. The gear unit according to claim 1, wherein the housing recess is formed on one face among the faces of the adjacent oscillating gears facing each other.

3. The gear unit according to claim 2, wherein the washer is housed within a range of the oscillating gear in an axial direction where the housing recess is formed.

4. The gear unit according to claim 1, wherein the housing recess comprises a first recess which is formed on one face among the faces of the adjacent oscillating gears facing each other, and a second recess which is formed on the other face among the faces of the adjacent oscillating gears facing each other, and the housing recess is formed by causing the adjacent oscillating gears to face each other and the first recess and the second recess to be communicated with each other.

5. The gear unit according to claim 1, wherein the washer includes a through-hole which penetrates the washer in a thickness direction thereof and can circulate a lubricant.

* * * * *